United States Patent
Miyazaki et al.

(10) Patent No.: US 12,517,384 B2
(45) Date of Patent: Jan. 6, 2026

(54) OPTICAL WAVEGUIDE DEVICE, OPTICAL MODULATOR, OPTICAL MODULATION MODULE, AND OPTICAL TRANSMISSION APPARATUS

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 528 days.

(21) Appl. No.: 18/012,021

(22) PCT Filed: Aug. 3, 2021

(86) PCT No.: PCT/JP2021/028809
§ 371 (c)(1),
(2) Date: Dec. 21, 2022

(87) PCT Pub. No.: WO2021/261605
PCT Pub. Date: Dec. 30, 2021

(65) Prior Publication Data
US 2023/0258967 A1    Aug. 17, 2023

(30) Foreign Application Priority Data
Jun. 22, 2020 (JP) ................. 2020-106759

(51) Int. Cl.
*G02B 6/42* (2006.01)
*G02F 1/035* (2006.01)
*G02F 1/21* (2006.01)

(52) U.S. Cl.
CPC ......... *G02F 1/0356* (2013.01); *G02B 6/4206* (2013.01); *G02F 1/212* (2021.01)

(58) Field of Classification Search
CPC . G02F 1/00; G02F 1/03; G02F 1/0018; G02F 1/0316; G02F 1/0344; G02F 1/035;
(Continued)

(56) References Cited

U.S. PATENT DOCUMENTS

| 4,693,543 | A | * | 9/1987 | Matsumura | ............ G02B 6/122 385/14 |
| 2014/0241659 | A1 | * | 8/2014 | Fukuda | ................. G02F 1/2257 385/3 |

FOREIGN PATENT DOCUMENTS

| JP | S60-15606 | 1/1985 |
| JP | H10-505174 | 5/1998 |

(Continued)

OTHER PUBLICATIONS

Suzuki et al., "Elastooptic Properties of InP"; Japanese Journal of Applied Physics, vol. 22, No. 3, Mar. 1983; pp. 441-445). (Year: 1983).*

(Continued)

*Primary Examiner* — Jie Lei
(74) *Attorney, Agent, or Firm* — Rankin, Hill & Clark LLP

(57) ABSTRACT

In an optical waveguide device using a convex optical waveguide, the absorption loss of guided light at an intersection between an optical waveguide and an electrode is reduced, without deteriorating optical characteristics and reducing long-term reliability. Provided is an optical waveguide device including a substrate on which an optical waveguide is formed, and an electrode having an intersection crossing over the optical waveguide on the substrate, in which the optical waveguide is formed with a protruding portion extending on the substrate, a resin layer is provided between the optical waveguide and the electrode at the intersection, the resin layer is formed to cover an upper surface and a side surface of the protruding portion of the
(Continued)

optical waveguide, and in a cross section along a width direction of the optical waveguide, a boundary with the electrode is formed with a curve.

10 Claims, 12 Drawing Sheets

(58) Field of Classification Search
CPC .......... G02F 1/21; G02F 1/0356; G02F 1/225; G02F 1/2257; G02F 1/212; G02F 1/0121; G02F 1/0152; G02F 1/2255; G02F 2201/07; G02F 2203/15; G02B 6/42; G02B 6/4206; G02B 6/29355; G02B 6/10; G02B 6/136; G02B 6/132; G02B 6/1345

USPC ........ 359/240, 279, 315, 245, 248; 385/2–4, 385/14, 20, 24, 32, 129, 131
See application file for complete search history.

(56) References Cited

FOREIGN PATENT DOCUMENTS

| JP | 2004-157500 A | 6/2004 |
| JP | 2009-181108   | 8/2009 |
| JP | 2009-181108 A | 8/2009 |
| JP | 2014-164243 A | 9/2014 |

OTHER PUBLICATIONS

International Search Report, International Application No. PCT/JP2021/028809, Date of mailing: Nov. 2, 2021, 3 pages.

* cited by examiner

PART A DETAILED

PART C DETAILED
VIII-VIII CROSS SECTION

OPTICAL WAVEGUIDE DEVICE, OPTICAL MODULATOR, OPTICAL MODULATION MODULE, AND OPTICAL TRANSMISSION APPARATUS

TECHNICAL FIELD

The present invention relates to an optical waveguide device, an optical modulator, an optical modulation module, and an optical transmission apparatus.

BACKGROUND ART

In a high-speed/large-capacity optical fiber communication system, an optical modulator incorporating an optical modulation device, which is an optical waveguide device composed of an optical waveguide formed on a substrate, is often used. Among these, optical modulation devices in which $LiNbO_3$ (hereinafter, also referred to as LN) having an electro-optic effect is used for substrates has a small optical loss and can realize a wide band optical modulation characteristic, so the optical modulation devices are widely used for high-speed/large-capacity optical fiber communication systems.

In particular, due to the increasing transmission capacity in recent years, the main stream of modulation methods in optical fiber communication systems is multi-level modulation and the transmission format adopting polarized wave multiplexing for multi-level modulation, such as Quadrature Phase Shift Keying (QPSK) and Dual Polarization-Quadrature Phase Shift Keying (DP-QPSK), which are used in fundamental optical transmission networks and is also being introduced into a metro networks.

Further, in recent years, for low-voltage driving and high-frequency modulation of the optical modulator itself, optical modulators using a rib-type optical waveguide or ridge optical waveguide (hereinafter collectively referred to as a convex optical waveguide) formed by forming band-shaped protruding portions on the surface of a thinned LN substrate (for example, a thickness of 20 μm or less) to further strengthen the interaction between the signal electric field and the guided light in the substrate (that is, to increase the electric field efficiency) are also being put to practical use (for example, Patent Literature No. 1).

An optical modulator that performs QPSK modulation (QPSK optical modulator) and an optical modulator that performs DP-QPSK modulation (DP-QPSK optical modulator) each include a plurality of Mach-Zehnder type optical waveguides in a nest structure called so-called nested type, each of which includes at least one signal electrode. Further, in an optical modulator using such a Mach-Zehnder type optical waveguide, bias electrodes for compensating for fluctuations in the bias points due to so-called DC drift are also generally formed.

These signal electrodes and bias electrodes (hereinafter, also collectively referred to as simply electrodes) are formed so as to extend to the vicinity of the outer periphery of the LN substrate for connection with an electric circuit outside the substrate. Therefore, on the substrate, the plurality of optical waveguides and the plurality of electrodes intersect in a complicated manner, and a plurality of intersections where the electrodes cross over the optical waveguides are formed.

When the optical waveguides and the electrodes are formed so as to be in direct contact with each other at the intersections, the light propagating through the optical waveguides is absorbed by the metal configuring the electrodes at these intersections, resulting in an optical loss (optical absorption loss). This optical loss can, for example, create an optical loss difference between the two parallel waveguides configuring the Mach-Zehnder type optical waveguide and deteriorate the extinction ratio of the modulated light. Since the required conditions for the extinction ratio are more severe as the modulation speed required for the optical modulator is higher, the deterioration of the extinction ratio is expected to become more apparent as the modulation speed increases with the increase of the transmission capacity.

Further, the intersections as described above can be widely and generally formed not only in an optical modulator using a Mach-Zehnder type optical waveguide, but also in an optical modulator using an optical waveguide that configures a directional coupler or a Y branch, and an optical waveguide device such as an optical switch. Then, the number of intersections on the substrate increases more and more when the optical waveguide pattern and the electrode pattern become complicated due to further miniaturization, multi-channelization, or high integration of the optical waveguide device, which may cause a non-negligible loss factor and limit the performance of the optical waveguide device.

As a technique for reducing the optical absorption loss due to the electrode metal formed on the optical waveguide, in the related art, a technique has been known in which a buffer layer made of $SiO_2$ is provided on the surface of the substrate on which the optical waveguide is formed, and the electrode metal is formed above the buffer layer (for example, Patent Literature No. 2). When this configuration is applied to an optical waveguide device composed of a convex optical waveguide, an intersection between the convex optical waveguide and the electrode can be configured as shown in FIG. 12. FIG. 12 is a cross-sectional view in the width direction of a convex optical waveguide 1202 formed on a substrate 1200, a $SiO_2$ layer 1204 is formed along the rectangular shape of the convex structure of the convex optical waveguide 1202, and an electrode 1206 is formed thereon.

However, since $SiO_2$ has higher rigidity than the LN substrate, when the $SiO_2$ layer is formed on the LN substrate, for example, due to the difference in linear expansion coefficient between the LN substrate and the $SiO_2$ layer, not only stress is applied to the substrate from the $SiO_2$ layer itself, but also stress from the electrode metal formed thereon (for example, internal stress generated inside the electrode metal during electrode formation) is applied to substrate via the $SiO_2$ layer.

Then, the stress generated in the $SiO_2$ layer and electrodes (signal electrode and/or bias electrode) described above and the stress caused by the difference in linear expansion coefficient between the LN substrate, the $SiO_2$ layer, and electrode metal can increase the probability of damage such as cracks occurring in the LN substrate, the $SiO_2$ layer, and the electrodes, and can lead to a decrease in long-term reliability of an optical waveguide device. Furthermore, these stresses adversely affect the optical characteristics and electrical characteristics of the optical waveguide device through the photoelastic effect of the LN substrate, and cause, for example, an increase in the loss of guided light and a deterioration in the extinction ratio.

In particular, in an optical waveguide device using a convex optical waveguide on a thinned LN substrate as described above, it is assumed that the effect of the stress becomes greater due to the decrease in mechanical strength due to thinning, and damage to the electrodes and the LN substrate and/or characteristic variations through the photoelastic effect are more likely to occur. Further, since stress tends to concentrate on the corner portions of the protruding portions of the substrate configuring the convex optical waveguide, the probability of damage such as cracks occurring in the electrode portion covering the corner portions may increase.

CITATION LIST

Patent Literature

[Patent Literature No. 1] Japanese Laid-open Patent Publication No. 2004-157500
[Patent Literature No. 2] Japanese Laid-open Patent Publication No. 2009-181108

SUMMARY OF INVENTION

Technical Problem

From the above background, in an optical waveguide device using a convex optical waveguide such as a rib-type optical waveguide or a ridge optical waveguide, it is required to effectively reduce an optical absorption loss of guided light due to an electrode metal, which may occur at the intersection of an optical waveguide and an electrode, without deteriorating optical characteristics and reducing long-term reliability of the optical waveguide device.

Solution to Problem

One aspect of the present invention is an optical waveguide device including a substrate on which an optical waveguide is formed; and an electrode that is formed on the substrate and has an intersection crossing over the optical waveguide, in which the optical waveguide is formed with a protruding portion extending on the substrate, a resin layer is provided between the optical waveguide and the electrode at the intersection, the resin layer is formed to cover an upper surface and a side surface of the protruding portion of the optical waveguide, and in a cross section along a width direction of the optical waveguide, a boundary with the electrode is formed with a curve.

According to another aspect of the present invention, the curve may have a radius of curvature of ¼ or more of a height of the protruding portion, measured from a surface of the substrate.

According to another aspect of the present invention, the resin layer may extend from the side surface of the protruding portion to a range wider than a width of the protruding portion along a width direction of the optical waveguide.

According to another aspect of the present invention, the resin layer may be formed such that a thickness at a top of the protruding portion has a value larger than the height of the protruding portion, measured from the surface of the substrate.

According to another aspect of the present invention, an intermediate layer containing silicon dioxide ($SiO_2$) may be formed on the upper surface of the protruding portion, and the resin layer is formed on a top of the intermediate layer.

According to another aspect of the present invention, the resin layer may be formed to extend over an adjacent plurality of the intersections.

According to another aspect of the invention, the resin layer may be formed of a plurality of layers.

According to another aspect of the invention, the substrate may be composed of a material having a photoelastic effect.

According to another aspect of the invention, the substrate may have a thickness of 20 µm or less.

Another aspect of the present invention is an optical modulator including: the optical waveguide device according to any one of claims 1 to 8, which is an optical modulation device that modulates light; a housing that houses the optical waveguide device; an optical fiber that inputs light to the optical waveguide device; and an optical fiber that guides the light output by the optical waveguide device to the outside of the housing.

Another aspect of the present invention is an optical modulation module including: the optical waveguide device according to any one of claims 1 to 8, which is an optical modulation device that modulates light; and a drive circuit that drives the optical waveguide device.

Another aspect of the present invention is an optical transmission apparatus including the optical modulator or the optical modulation module, and an electronic circuit that generates an electrical signal for causing the optical waveguide device to perform a modulation operation.

This specification includes all the contents of Japanese Patent Application No. 2020-106759 filed on Jun. 22, 2020.

Advantageous Effects of Invention

According to the present invention, in the optical waveguide device using a convex optical waveguide, it is possible to effectively reduce an optical absorption loss of guided light due to an electrode metal, which may occur at the intersection of an optical waveguide and an electrode on a substrate, without deteriorating optical characteristics and reducing long-term reliability of the optical waveguide device.

DESCRIPTION OF EMBODIMENTS

Hereinafter, embodiments of the present invention will be described with reference to the drawings.

First Embodiment

Figure 1:
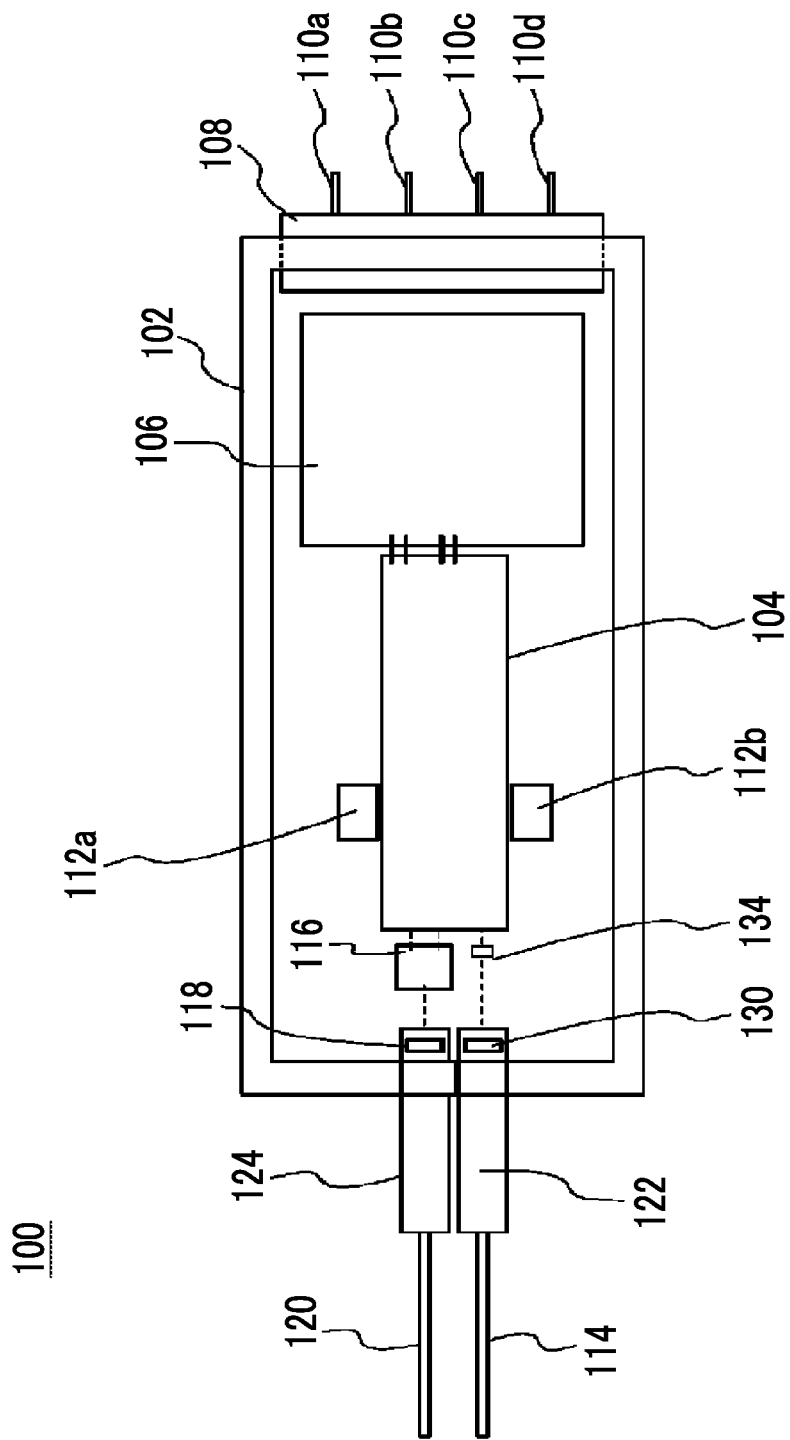
FIG. 1 is a diagram illustrating a configuration of an optical modulator according to a first embodiment of the present invention.

FIG. 1 is a diagram illustrating a configuration of an optical modulator 100 using an optical modulation device, which is an optical waveguide device according to a first embodiment of the present invention. The optical modulator 100 includes a housing 102, an optical modulation device 104 housed in the housing 102, and a relay substrate 106. The optical modulation device 104 is, for example, a DP-QPSK modulator. Finally, a cover (not illustrated), which is a plate body, is fixed to the opening of the housing 102, and the inside of the housing is airtightly sealed.

The optical modulator 100 also includes signal pins 110a, 110b, 110c, and 110d for inputting a high-frequency electrical signal used for modulation of the optical modulation device 104, and a feedthrough section 108 for introduction these signal pins 110a, 110b, 110c, and 110d into the housing 102.

Further, the optical modulator 100 includes an input optical fiber 114 for inputting light into the housing 102 and an output optical fiber 120 for guiding the light modulated by the optical modulation device 104 to the outside of the housing 102 on the same surface of the housing 102.

Here, the input optical fiber 114 and the output optical fiber 120 are fixed to the housing 102 via the supports 122 and 124, which are fixing members, respectively. The light input from the input optical fiber 114 is collimated by the lens 130 disposed in the support 122, and then input to the optical modulation device 104 via the lens 134. However, this is only an example, and the light input to the optical modulation device 104 may be performed by introducing, for example, the input optical fiber 114 according to the related art into the housing 102 via the support 122, and connecting the end face of the introduced input optical fiber 114 to the end face of the substrate 230 (described later) of the optical modulation device 104.

The optical modulator 100 also has an optical unit 116 that polarizes and synthesizes two beams of modulated light output from the optical modulation device 104. The light after polarization synthesis, output from the optical unit 116, is collected by the lens 118 disposed in the support 124 and coupled to the output optical fiber 120.

The relay substrate 106 relays high-frequency electrical signals input from signal pins 110a, 110b, 110c, and 110d to the optical modulation device 104 by a conductor pattern (not illustrated) formed on the relay substrate 106. The conductor pattern on the relay substrate 106 is connected to a pad (described later) configuring one end of the signal electrode of the optical modulation device 104 by wire bonding or the like, for example. Further, the optical modulator 100 includes two terminators 112a and 112b having predetermined impedances in the housing 102. Note that the number of these terminator is not limited to two, and may be any number according to the number of termination resistors formed on the substrate 230.

Figure 2:
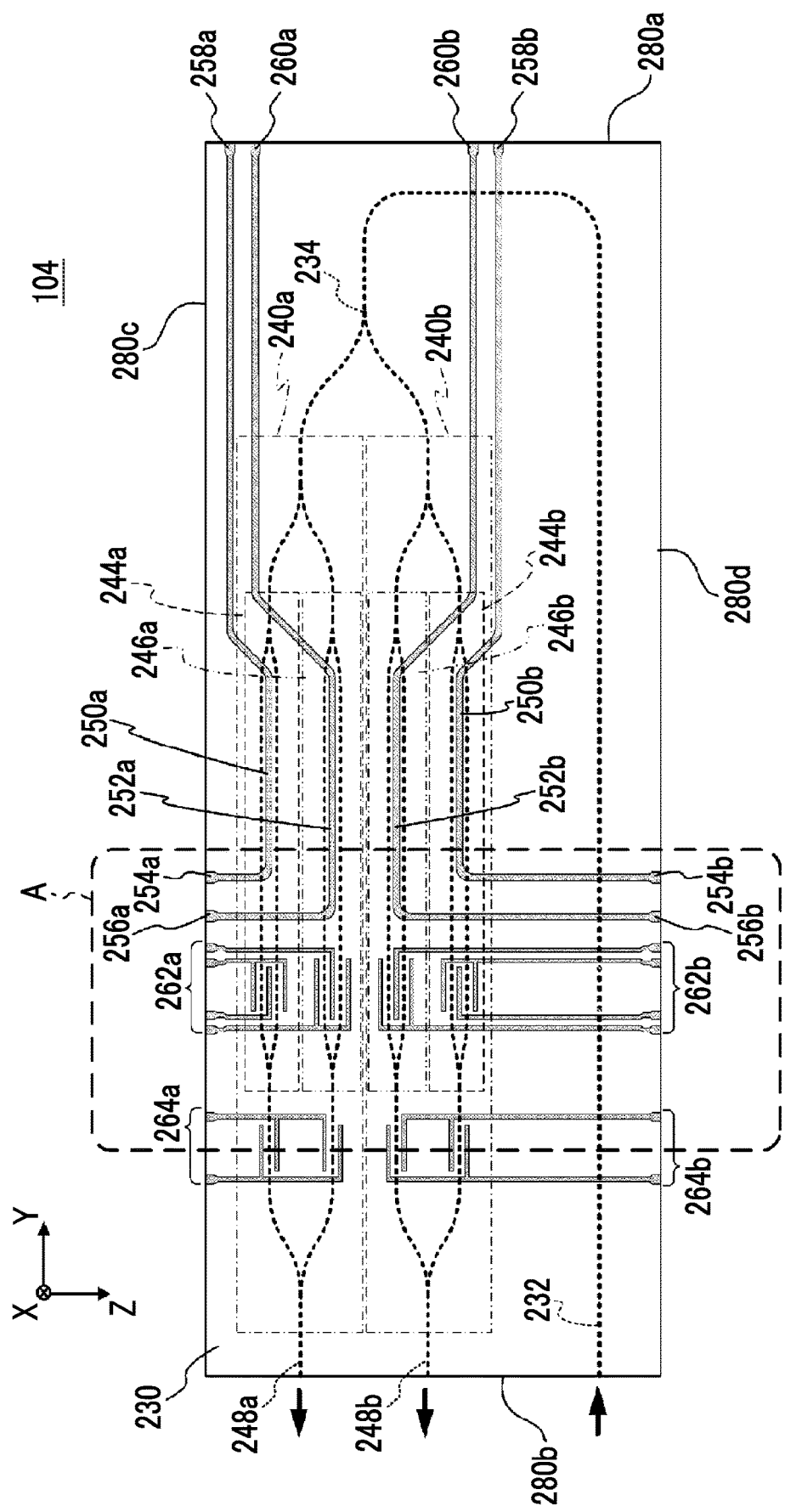
FIG. 2 is a diagram illustrating a configuration of an optical modulation device used in the optical modulator illustrated in FIG. 1.

FIG. 2 is a diagram illustrating an example of the configuration of the optical modulation device 104, which is an optical waveguide device housed in the housing 102 of the optical modulator 100 illustrated in FIG. 1. The optical modulation device 104 is composed of an optical waveguide (bold dotted line) formed on a substrate 230, and performs, for example, 200G DP-QPSK modulation. The substrate 230 is, for example, a thinned X-cut LN substrate having an electro-optic effect, which is processed to a thickness of 20 µm or less (for example, 2 µm) and thinned. The optical waveguide is a convex optical waveguide (for example, a rib-type optical waveguide or a ridge optical waveguide) including a band-shaped extending protruding portion formed on the surface of the thinned substrate 230. Here, since in the LN substrate, the refractive index can locally change due to the photoelastic effect when stress is applied, the LN substrate is adhered to a support substrate such as a silicon (Si) substrate, a glass substrate, or LN in order to reinforce the mechanical strength of the entire substrate. In the present embodiment, the substrate 230 is adhered to a support substrate 592 via the adhesive layer 590, as will be described later.

The substrate 230 is, for example, rectangular and has two left and right sides 280a and 280b, which extend in the up-down direction and face each other, and upper and lower sides 280c and 280d, which extend in the left-right direction and face each other. In FIG. 2, as illustrated by the coordinate axes illustrated in the upper left part, the normal direction toward the back of the paper surface of FIG. 2 (from the front surface to the rear surface) is the X direction, the right direction is the Y direction, and the lower direction is the Z direction.

The optical modulation device 104 includes an input waveguide 232 that receives the input light (arrow pointing to the right) from the input optical fiber 114 on the lower side of the left side 280b of the substrate 230, and a branched waveguide 234 that branches the input light into two light beams having the same light amount. Further, the optical modulation device 104 includes a so-called nested Mach-Zehnder type optical waveguides 240a and 240b (each is a part surrounded by a dot-dashed line), which are two modulation units for modulating each light branched by the branched waveguide 234.

The nested Mach-Zehnder type optical waveguides 240a and 240b include two Mach-Zehnder type optical waveguides 244a (inside the dashed line) and 246a (inside the two-dot chain line), and 244b (inside the dashed line) and 246b (inside the two-dot chain line), respectively, provided in the two waveguide parts forming a pair of parallel waveguides. Thus, the nested Mach-Zehnder type optical waveguides 240a and 240b QPSK-modulate each of the input light branched into two beams by the branched waveguide 234, and then output the modulated light (output) from the respective output waveguides 248a and 248b to the left.

These two output light beams are then polarized and synthesized by an optical unit 116 disposed outside the substrate 230 and are combined into one light beam. Hereinafter, the input waveguide 232, the optical waveguides such as the branched waveguide 234, and the nested Mach-Zehnder type optical waveguides 240a and 240b which are formed on the substrate 230 of the optical modulation device 104 and the Mach-Zehnder type optical waveguides 244a, 246a, 244b, and 246b included in the nested Mach-Zehnder type optical waveguides 240a and 240b are collectively referred to as an optical waveguide 232 or the like. As described above, these optical waveguides 232 and the like are convex optical waveguides configured by protruding portions extending in a band shape on the substrate 230.

On the substrate 230, signal electrodes 250a, 252a, 250b, and 252b for respectively causing total four Mach-Zehnder type optical waveguides 244a, 246a, 244b, and 246b configuring the nested Mach-Zehnder type optical waveguides 240a and 240b to perform modulation operations are provided. The signal electrodes 250a and 252a are bent to the left, extend to the upper side 280c of the substrate 230, and are connected to the pads 254a and 256a. The right sides of the signal electrodes 250a and 252a extend to the right side 280a of the substrate 230 and is connected to the pads 258a and 260a.

Similarly, the left sides of the signal electrodes 250b and 252b extend to the lower side 280d of the substrate 230 and are connected to the pads 254b and 256b, and the right sides of the signal electrodes 250b and 252b extend to the right side 280a of the substrate 230 and are connected to the pads 258b and 260b. The pads 258a, 260a, 258b, and 260b are connected to the relay substrate 106 described above by wire bonding or the like.

The signal electrodes 250a, 252b, 250b, and 252b form, for example, a coplanar transmission line having a predetermined impedance together with a ground conductor pattern (not illustrated) formed on the substrate 230, according to the related art. The ground conductor pattern is provided so as not to be formed on the optical waveguide 232 or the like, and the plurality of regions formed by dividing the ground conductor pattern by the optical waveguide 232 or the like can be connected to each other by wire bonding or the like.

The pads 254a, 256a and the pads 254b, 256b are respectively connected to the terminators 112a and 112b described above. Thus, the high-frequency electrical signals input from the relay substrate 106 connected to the pads 258a, 260a, 258b, and 260b become traveling waves to propagate through the signal electrodes 250a, 252a, 250b, and 252b, and modulate the light waves propagating through the Mach-Zehnder type optical waveguides 244a, 246a, 244b, and 246b, respectively.

Here, the substrate 230 is formed in a thickness of 20 µm or less, preferably 10 µm or less, such that the interaction between the electric field formed in the substrate 230 by the signal electrodes 250a, 252a, 250b, and 252b and the guided light propagating through the Mach-Zehnder type optical waveguides 244a, 246a, 244b, and 246b is further strengthened to perform a high-speed modulation operation at a lower voltage. In addition, the back surface (the surface facing the surface illustrated in FIG. 2) of the substrate 230 is adhered to a support substrate such as glass via an adhesive layer (not illustrated in FIG. 2, described as the adhesive layer 590 and the support substrate 592 in FIG. 4 and the like to be described later).

The optical modulation device 104 is also provided with bias electrodes 262a, 264a, and 262b, 264b for compensating for fluctuations in the bias point due to so-called DC drift. The bias electrodes 262a and 262b are each composed of two pairs of electrodes, and are used to compensate for fluctuations in the bias points of the Mach-Zehnder type optical waveguides 244a, 246a and 244b, 246b, respectively. Further, the bias electrodes 264a and 264b are used to compensate for fluctuations in the bias points of the nested Mach-Zehnder type optical waveguides 240a and 240b, respectively.

These bias electrodes 262a, 264a, and 262b, 264b also extend to the sides 280c and 280d of the substrate 230, respectively, and are connected to a bias control circuit outside the housing via lead pins (not illustrated) provided in the vicinity of the sides 280c and 280d, for example, on the side surface of the housing 102. Thus, the bias electrodes 262a, 264a, 262b, and 264b are driven by the bias control circuit to compensate for fluctuations in the bias points of the corresponding Mach-Zehnder type optical waveguides. Hereinafter, the signal electrodes 250a, 252a, 250b, 252b and the bias electrodes 262a, 264a, 262b, 264b are collectively referred to as electrodes 250a and the like.

The bias electrodes 262a, 264a, 262b, and 264b are electrodes to which a direct current or low frequency electrical signal is applied, and are formed with a thickness in the range of 0.3 µm or more and 5 µm or less, for example, when the thickness of the substrate 230 is 20 µm. On the other hand, the signal electrodes 250a, 252b, 250b, and 252b described above are formed in the range of 20 µm or more and 40 µm or less, for example, in order to reduce the conductor loss of the high-frequency electrical signal applied to the signal electrodes. The thickness of the signal electrode 250a and the like is determined according to the thickness of the substrate 230 in order to set the impedance and microwave effective refractive index to desired values, and it can be determined thicker when the thickness of the substrate 230 is thick, and it can be determined to be thinner when the thickness of the substrate 230 is thin.

The optical modulation device 104 configured as described above includes many intersecting portions where the electrodes 250a or the like cross (traverse) over the optical waveguide 232 or the like. As can be easily understood from the description in FIG. 2, in FIG. 2, all the parts where the bold dotted lines illustrating the optical waveguide 232 and the like and the band-shaped parts illustrating the electrode 250a and the like intersect with each other are intersecting portions where the electrode 250a and the like intersect over the optical waveguide 232 and the like. In the present embodiment, the optical modulation device 104 includes a total of 50 intersecting portions.

Figure 3:
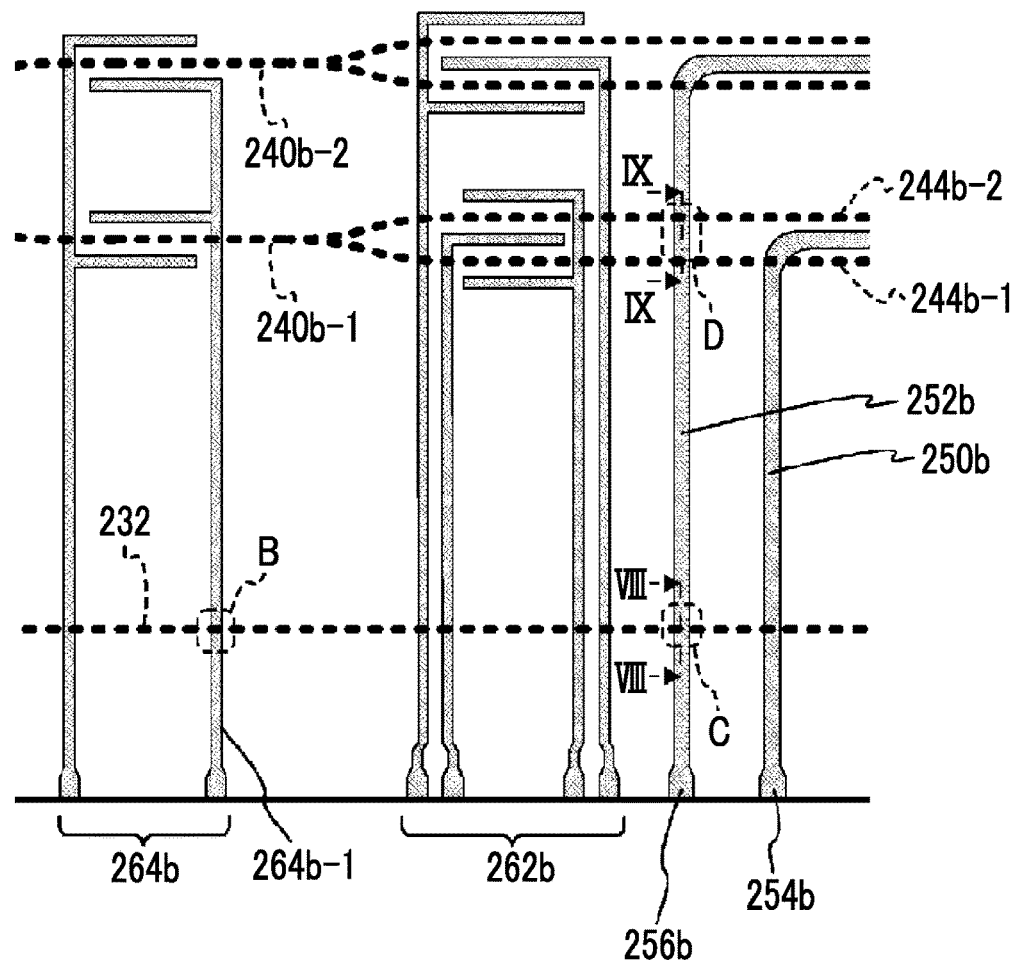
FIG. 3 is a partial detailed view of a part A of the optical modulation device illustrated in FIG. 2.

FIG. 3 is a partial detailed view of a part A of the optical modulation device 104 illustrated in FIG. 2.

Hereinafter, taking the parts B, C, and D which are intersecting portions shown in FIG. 3 as an example, the configuration of these intersecting portions will be described.

Figure 4:
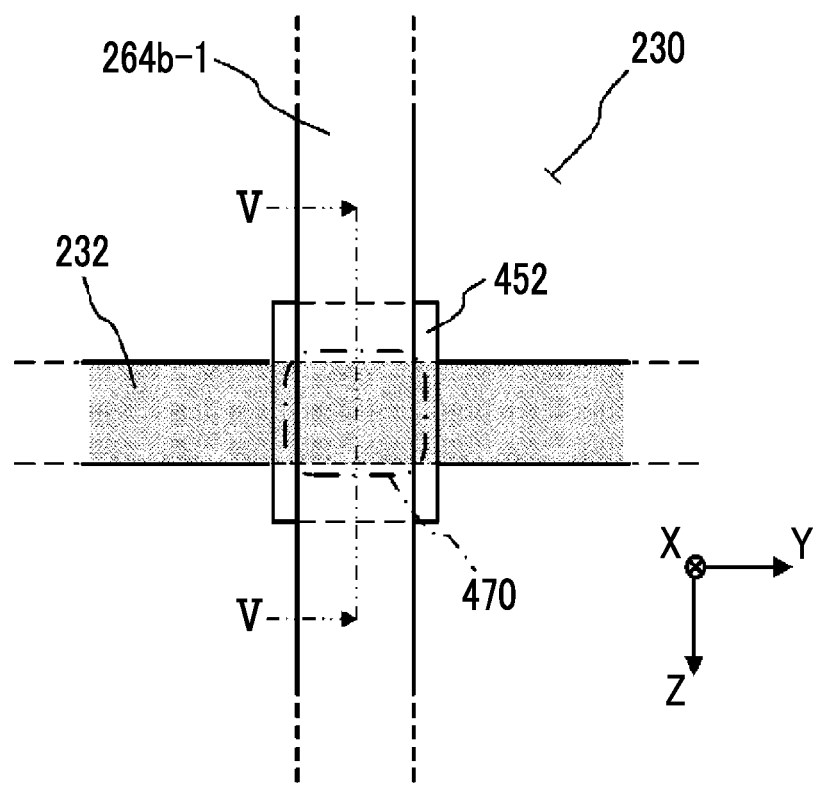
FIG. 4 is a plan view of a part B illustrated in FIG. 3.
Figure 5:
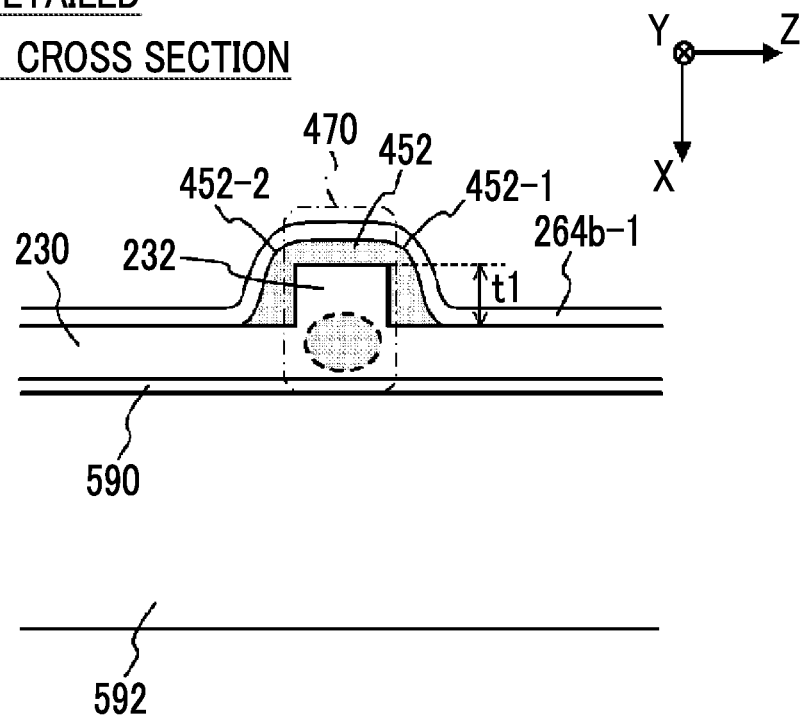
FIG. 5 is a cross-sectional view taken along line V-V of the part B illustrated in FIG. 4.

First, the configuration of the part B shown in FIG. 3 will be described as a first configuration example of the intersecting portion. FIGS. 4 and 5 are partially detailed views showing the configuration of the part B where the bias electrode 264b-1, which is part of the bias electrode 264b, crosses over input waveguide 232. Here, FIG. 4 is a plan view of the part B, and FIG. 5 is a cross-sectional view taken along line V-V of the part B illustrated in FIG. 4.

The configurations illustrated in FIGS. 4, and 5 are examples of the configuration of the parts where the optical waveguide 232 and the like and the electrode 250a and the like intersect each other in the optical modulation device 104, and these can be similarly used for any part where the optical waveguide 232 and the like and the electrode 250a and the like intersect each other, other than the part B.

In FIG. 4, the bias electrode 264b-1 extending in the up-down direction (Z direction) and the input waveguide 232 extending in the left-right direction (Y direction) intersect with each other to form an intersection 470 (a part surrounded by the rectangle of a dot-dashed line). In addition, in FIG. 5, an illustrated dotted ellipse drawn in the cross-section of the input waveguide 232 schematically shows guided light propagating through the input waveguide 232 (similarly, in FIGS. 6 to 9, the guided light is indicated by the dotted ellipse).

In particular, as shown in FIG. 5, in the present embodiment, a resin layer 452 is formed to cover the upper and side surfaces of the protruding portions of the substrate 230 that configures the input waveguide 232, between the input waveguide 232, which is a convex optical waveguide, and the bias electrode 264b-1, in the portion of the substrate 230 that includes the intersection 470. In the cross section along the width direction of the input waveguide 232 (that is, the cross section shown in FIG. 5, for example), the resin layer 452 has a curved boundary with the bias electrode 264b-1. Specifically, in the cross section, the resin layer 452 has curves 452-1 and 452-2 at the corners (corner portions) on the bias electrode 264b-1 side.

Here, the resin layer 452 can be, for example, a photoresist used in the patterning process of the electrodes 250a and the like. In particular, the resin layer 452 is preferably a photoresist containing a cross-linking agent, from the viewpoint of long-term reliability. Further, the portions of the curves 452-1 and 452-2 forming the corner portions on the side of the bias electrode 264b-1 can be formed by deforming the shape of the photoresist, for example, by setting the temperature rise rate of the photoresist during high-temperature treatment after patterning to a rate (for example, 5° C./min) higher than the normal 1° C./min. Alternatively, the portions of the curves 452-1 and 452-2 can be formed by subjecting the photoresist forming the resin layer 452, for example, to plasma treatment (for example, ashing treatment).

Further, as described above, the bias electrode 264b-1 is formed relatively thin, for example, in the range of 0.3 μm to 5 μm in thickness, so the resin layer 452 shown in FIG. 5 is formed with a thickness in the range of 0.3 μm to 1 μm, which is about the same as the thickness of an $SiO_2$ layer in the related art.

In addition, in FIG. 5, the substrate 230 is fixed to the support substrate 592 via the adhesive layer 590. Here, the adhesive layer 590 is made of, for example, a thermosetting resin, or the like, and the support substrate 592 is made of, for example, a glass substrate, an LN substrate, a Si substrate, or the like.

A resin layer 452 is provided between the input waveguide 232 and the bias electrode 264b-1 at the intersection 470 in the part B of the optical modulation device 104 having the above configuration. This prevents the occurrence of absorption loss of the guided light of the input waveguide 232, which is due to the metal forming the bias electrode 264b-1.

In particular, the resin such as photoresist that configures the resin layer 452 has a Young's modulus of about 1 to 2 GPa, which is one digit smaller than 72 GPa to 74 GPa for $SiO_2$ used between the electrode and the optical waveguide in the related art described above, and is lower in rigidity than $SiO_2$. Therefore, in the part B of the optical modulation device 104, the stress applied from the resin layer 452 to the substrate 230 and the stress transmitted from the bias electrode 264b-1 to the substrate 230 via the resin layer 452 can be reduced as compared to the configuration of the related art using the $SiO_2$ layer. Therefore, damage to the substrate 230 and/or the electrode 250a due to these stresses, and fluctuations in optical characteristics and/or electrical characteristics due to the photoelastic effect are reduced.

Further, in the cross section along the width direction of the input waveguide 232 shown in FIG. 5, since the resin layer 452 has a curved boundary with the bias electrode 264b-1 (for example, curves 452-1 and 452-2), the continuity of the shape of the bias electrode 264b-1 at the boundary is increased (that is, sharp changes in shape are relaxed). Therefore, together with reduction in distortion due to the low rigidity of the resin layer 452, the occurrence of damage such as cracks in the bias electrode 264b-1 is further reduced. Here, the radius of curvature of the curve formed by the resin layer 452 at the boundary with the bias electrode 264b-1 in the above cross section is, from the viewpoint of reducing the occurrence of such damage, desirably ¼ or more of the height t1 of the convex optical waveguide that configures the input waveguide 232, for example.

With the above configuration, in the optical modulation device 104, by using the same configuration as the configuration of the part B at other intersections between the electrodes 250a and the like and the optical waveguide 232 and the like, it is possible to effectively reduce optical absorption loss of guided light due to the metal forming the electrodes 250a and the like, which may occur at the intersections between the optical waveguides 232 and the like on the substrate 230 and the electrodes 250a and the like, without deteriorating optical characteristics and reducing long-term reliability of the optical modulation device 104.

From the viewpoint of reducing cracks or disconnection of the resin layer 452 and/or the bias electrode 264b-1 at the intersection 470, it is desirable that in the resin layer 452, the layer thickness at the top of the input waveguide 232 and the length extending from the side surface of the input waveguide 232 to the surface of the substrate 230 are greater than the height and width of the substrate protruding portions that configure the input waveguide 232, which is a convex optical waveguide, respectively.

Figure 6:
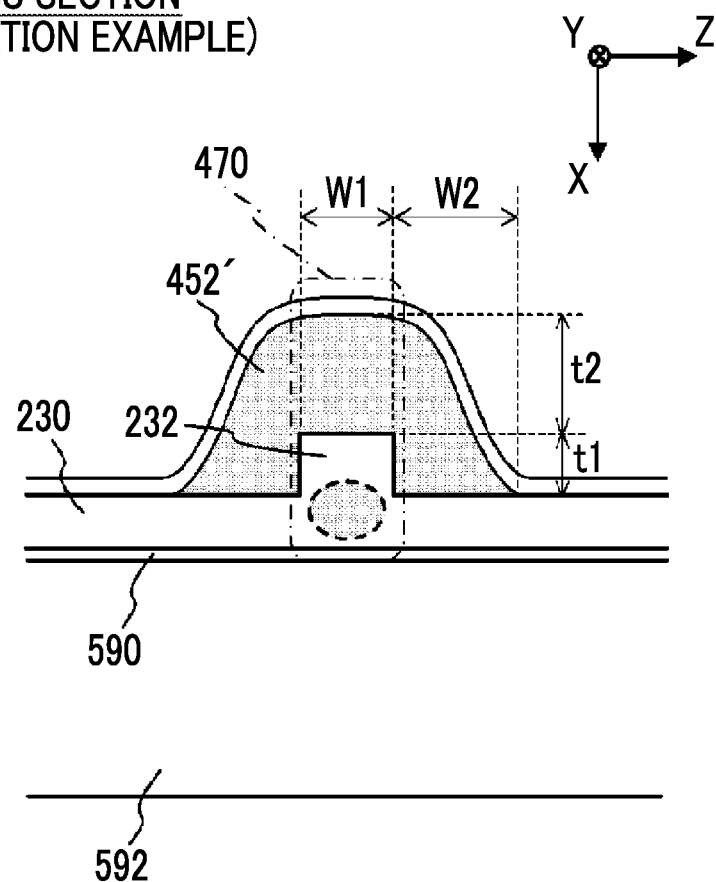
FIG. 6 is a first modification example of the configuration of the part B illustrated in FIG. 5.

FIG. 6 is a diagram showing a first modification example of the configuration of the intersection 470 in the part B, having such a configuration. In the configuration shown in FIG. 6, a resin layer 452' is formed instead of the resin layer 452 shown in FIG. 5. The resin layer 452' has the same configuration as the resin layer 452, but differs from the resin layer 452 in layer thickness and width extending over the substrate 230.

Specifically, the resin layer 452' has a curved boundary with the bias electrode 264b-1 similar to the resin layer 452, but unlike the resin layer 452, the layer thickness t2 at the top of the input waveguide 232 is formed thicker than the height t1 of the protruding portion forming the input waveguide 232, measured from the surface of the substrate 230. Further, the resin layer 452' is formed such that the distance W2 from the side surface of the protruding portion configuring the input waveguide 232 to the end portion of the resin layer 452' is wider (or longer) than the width W1 of the protruding portion.

Thus, in the configuration shown in FIG. 6, compared to the configuration shown in FIG. 5, the stress applied to the substrate 230 due to the internal stress of the bias electrode 264b-1 and the stress applied to the substrate 230 and/or the bias electrode 264b-1 due to the difference in the linear expansion coefficient of each part are relaxed. As a result, in the configuration shown in FIG. 6, compared to the configuration shown in FIG. 5, while more effectively avoiding the deterioration of the optical characteristics of the optical modulation device 104 and the reduction in the long-term reliability, it is possible to reduce optical absorption loss of guided light that may occur at intersections between the optical waveguides 232 and the like and the electrode 250a and the like.

Figure 7:
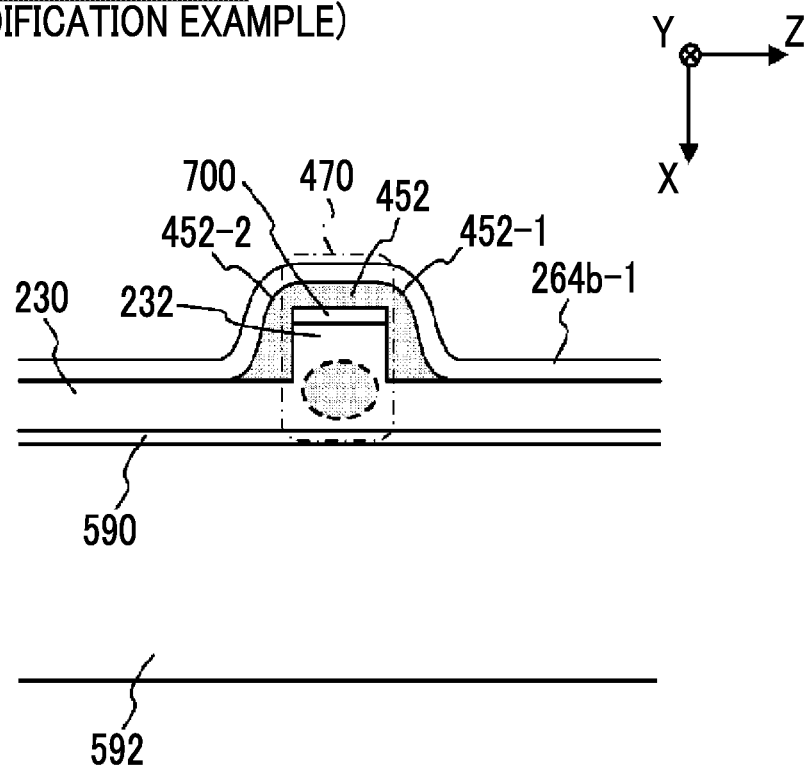
FIG. 7 is a second modification example of the configuration of the part B illustrated in FIG. 5.

FIG. 7 is a diagram showing a second modification example of the configuration of the intersection 470 in the part B. In the configuration shown in FIG. 7, in addition to the configuration shown in FIG. 5, an intermediate layer 700 made of $SiO_2$ is formed on the top of the protruding portion that configures the input waveguide 232, and a resin layer 452 is provided between the intermediate layer 700 and the bias electrode 264b-1. That is, the resin layer 452 is formed to cover the side surfaces of the protruding portions that configure the input waveguide 232 and cover the upper surface of the protruding portions via the intermediate layer 700. Here, the thickness of the intermediate layer 700 is, for example, 0.5 µm, which is sufficient to reduce optical absorption loss in the input waveguide 232 due to the bias electrode 264*b*-1, as in the related art. Further, the resin layer 452 may be formed with a thickness of 3 µm, for example.

The configuration shown in FIG. 7 is suitable for reducing disconnection of the bias electrode 264*b*-1 at the intersection 470 while utilizing the high electrical insulation, transparency, and stability over time of, for example, $SiO_2$ that configures the intermediate layer 700. In the configuration shown in FIG. 7, since the intermediate layer 700 provided on the input waveguide 232 is protected by the resin layer 452, it is also possible to prevent damage such as cracks from occurring in the corner portions of the intermediate layer 700 due to the stress from the bias electrode 264*b*-1.

Figure 8:
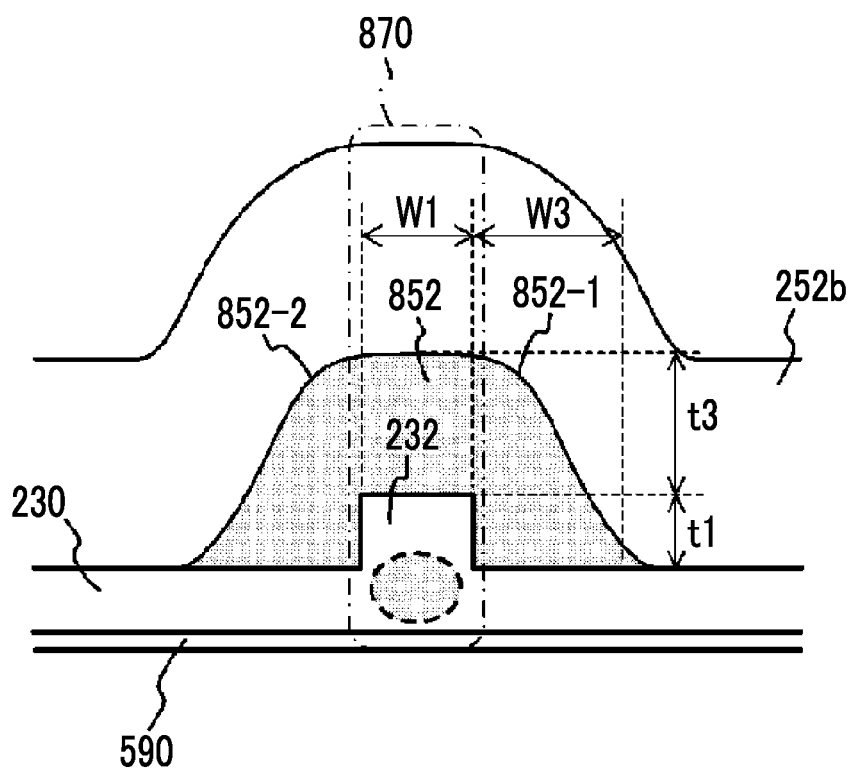
FIG. 8 is a cross-sectional view taken along line VIII-VIII of a part C illustrated in FIG. 3.

Next, the configuration of the part C shown in FIG. 3 will be described as a second configuration example of the intersecting portion. FIG. 8 is a cross-sectional view taken along line VIII-VIII of the part C where the input waveguide 232 and the signal electrode 252*b* intersect.

The configurations illustrated in FIG. 8 is an examples of the configuration of a part where the optical waveguide 232 and the like and the electrode 250*a* and the like intersect each other in the optical modulation device 104, and this can be similarly used for any part where the optical waveguide 232 and the like and the electrode 250*a* and the like intersect each other, other than the part C.

In FIG. 8, the signal electrode 252*b* extending in the left-right direction (Z direction) crosses (traverses) over the input waveguide 232 extending in the normal direction (Y direction) of the drawing to form an intersection 870 (a part surrounded by the rectangle of a dot-dashed line).

The configuration of the part C shown in FIG. 8, similar to the configuration of the part B shown in FIG. 5, a resin layer 852 is formed to cover the upper and side surfaces of the protruding portions of the substrate 230 that configures the input waveguide 232, between the signal electrode 252*b* and the input waveguide 232, in the portion of the substrate 230 that includes the intersection 870. However, the signal electrode 252*b* is thickly configured with a thickness of 20 to 40 µm, compared to the bias electrode 264*b*-1 formed with a thickness of 0.3 µm to 5 µm.

Further, similar to the resin layer 452 shown in FIG. 5, the resin layer 852 has a curved boundary with the signal electrode 252*b*, in the cross section of the resin layer 852 along the width direction of the input waveguide 232 (that is, the cross section shown in FIG. 8, for example). Specifically, the resin layer 852 has curves 852-1 and 852-2 at the boundaries of the corners (corner portions) on the signal electrode 252*b* side in the cross section.

Further, similar to the first modification example of the configuration of FIG. 5 shown in FIG. 6, the resin layer 852 is formed such that the layer thickness t3 at the top of the input waveguide 232 is thicker than the height t1 of the protruding portions forming the input waveguide 232, as the desirable form described above. Further, the resin layer 852 is formed such that the distance W3 from the side surface of the protruding portion configuring the input waveguide 232 to the end portion of the resin layer 852 is wider (or longer) than the width W1 of the protruding portion.

In the intersection 870 having the above configuration, similar to the configuration of the intersection 470 shown in FIG. 5 or 7, since the resin layer 852 is provided between the input waveguide 232 and the signal electrode 252*b*, compared to the configuration in the related art in which the $SiO_2$ layer is interposed, the stress transmitted from the signal electrode 252*b* to the substrate 230 and the stress applied to the substrate 230 and/or the signal electrode 252*b* can be reduced. Further, since the resin layer 852 has a curved boundary with the signal electrode 252*b* in the cross section along the width direction of the input waveguide 232 shown in FIG. 8, it is possible to prevent the stress from concentrating on the vicinity of the corners (corner portions) of the resin layer 852, thereby preventing the signal electrode 252*b* from being damaged such as cracks or disconnection.

Figure 9:
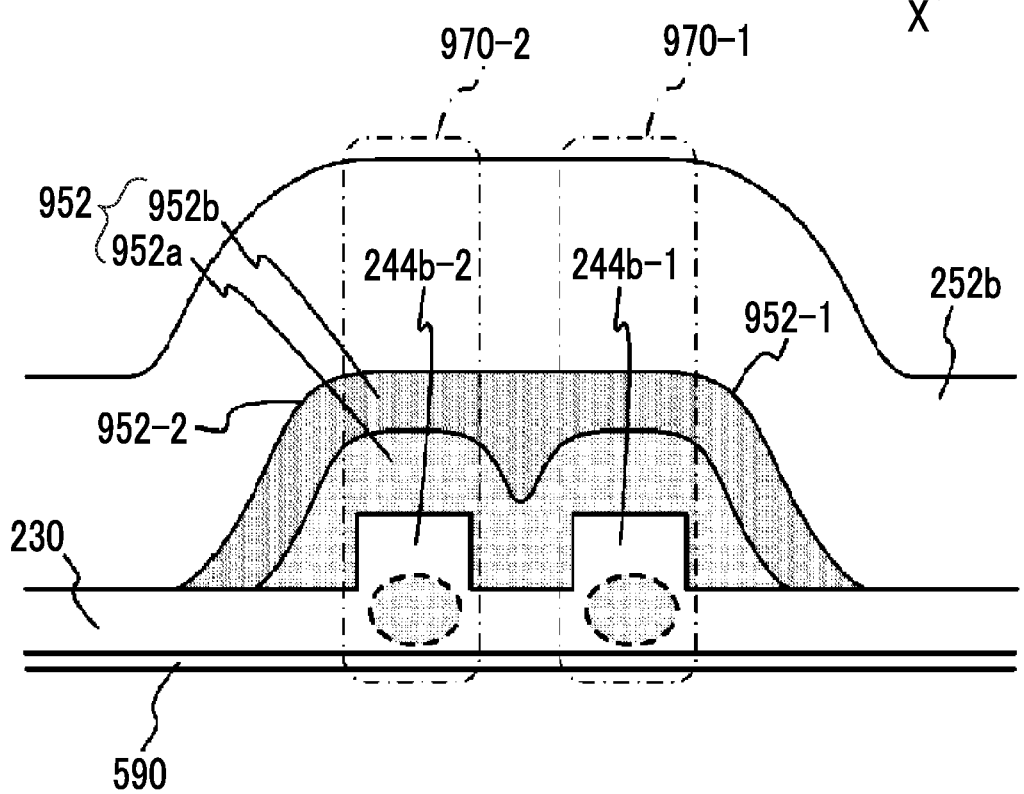
FIG. 9 is a cross-sectional view taken along line IX-IX of a part D illustrated in FIG. 3.

Next, the configuration of the part D shown in FIG. 3 will be described as a third configuration example of the intersecting portion. In the present configuration example, one resin layer is provided across two intersections. FIG. 9 is a cross-sectional view taken along line IX-IX of the part D including two intersections 970-1 and 970-2 where the signal electrode 252*b* crosses over the two parallel waveguides 244*b*-1 and 244*b*-2 configuring the Mach-Zehnder type optical waveguide 244*b*.

Note that the configuration shown in FIG. 9 can be applied not only to the intersections of the parallel waveguides and the electrodes that configure the Mach-Zehnder type optical waveguide, but also to any adjacent plurality of intersections where the optical waveguides 232 and the like intersect with the electrodes 250*a* and the like.

In FIG. 9, the signal electrode 252*b* extending in the left-right direction (Z direction) crosses (traverses) over the parallel waveguides 244*b*-1 and 244*b*-2 extending in the normal direction (Y direction) of the drawing to intersections 970-1 and 970-2, respectively.

A resin layer 952 provided between the signal electrode 252*b* and the substrate 230 is formed so as to extend across the adjacent intersections 970-1 and 970-2. Thus, a resin layer 952 is formed to cover the upper and side surfaces of the protruding portions of the substrate 230 that configure the parallel waveguides 244*b*-1 and 244*b*-2 between signal electrode 252*b* and parallel waveguides 244*b*-1 and 244*b*-2 at intersections 970-1 and 970-2, respectively.

The resin layer 952 has a curved boundary with the signal electrode 252*b* in a cross section along the width direction of the parallel waveguides 244*b*-1 and 244*b*-2 (that is, the cross section shown in FIG. 9, for example). Specifically, the resin layer 952 has curves 952-1 and 952-2 at the boundaries of the corners (corner portions) on the signal electrode 252*b* side in the cross section.

Here, in the present embodiment, the resin layer 952 is composed of two layers: a resin layer 952*a* in contact with the parallel waveguides 244*b*-1 and 244*b*-2, and a resin layer 952*b* provided on the resin layer 952*a*. The resin layers 952*a* and 952*b* may be made of the same resin, or may be made of resins having different viscosities when applied. For example, the resin layer 952*b* can be made of a resin having a higher viscosity when applied than the resin layer 952*a*. Thereby, in the cross section, the boundary between the resin layer 952 and the signal electrode 252*b* (that is, the boundary between the resin layer 952*b* and the signal electrode 252*b*) can be easily configured with a curve.

According to the configuration above, similar to the configurations shown in FIGS. 5 to 8, the resin layer 952 can prevent optical absorption loss due to the signal electrode 252*b* in the parallel waveguides 244*b*-1 and 244*b*-2, and relaxes or disperses the stress applied to the substrate 230 and/or the stress applied to the signal electrode 252*b* to prevent deterioration of optical characteristics and reduction in long-term reliability.

Further, according to the above configuration, one resin layer 952 is provided across a plurality of intersections 970-1 and 970-2, so the number of resin layers formed on the substrate 230 can be reduced and the manufacturing yield can be improved. Further, since one resin layer 952 is provided across a plurality of intersections 970-1 and 970-2, the area of the portion of the resin layer 952 in contact with the substrate of the substrate 230 is increased, so the adhesion of the resin layer 952 to the substrate 230 can be improved.

Further, in general, since the space between two adjacent convex optical waveguides has a recess shape, when forming a resin layer across two intersections between these adjacent convex optical waveguides and electrodes, unevenness may occur between the resin layer and the electrodes thereon. Such unevenness tends to cause uneven distribution of stress, and can reduce the stress relaxation action and stress dispersion action on the electrode and substrate. On the other hand, in the configuration shown in FIG. 9, the resin layer 952 is composed of two layers, so that the upper surface of the resin layer 952b, which is the upper layer, can be easily configured as a smooth curved surface with less unevenness.

Second Embodiment

Figure 10:
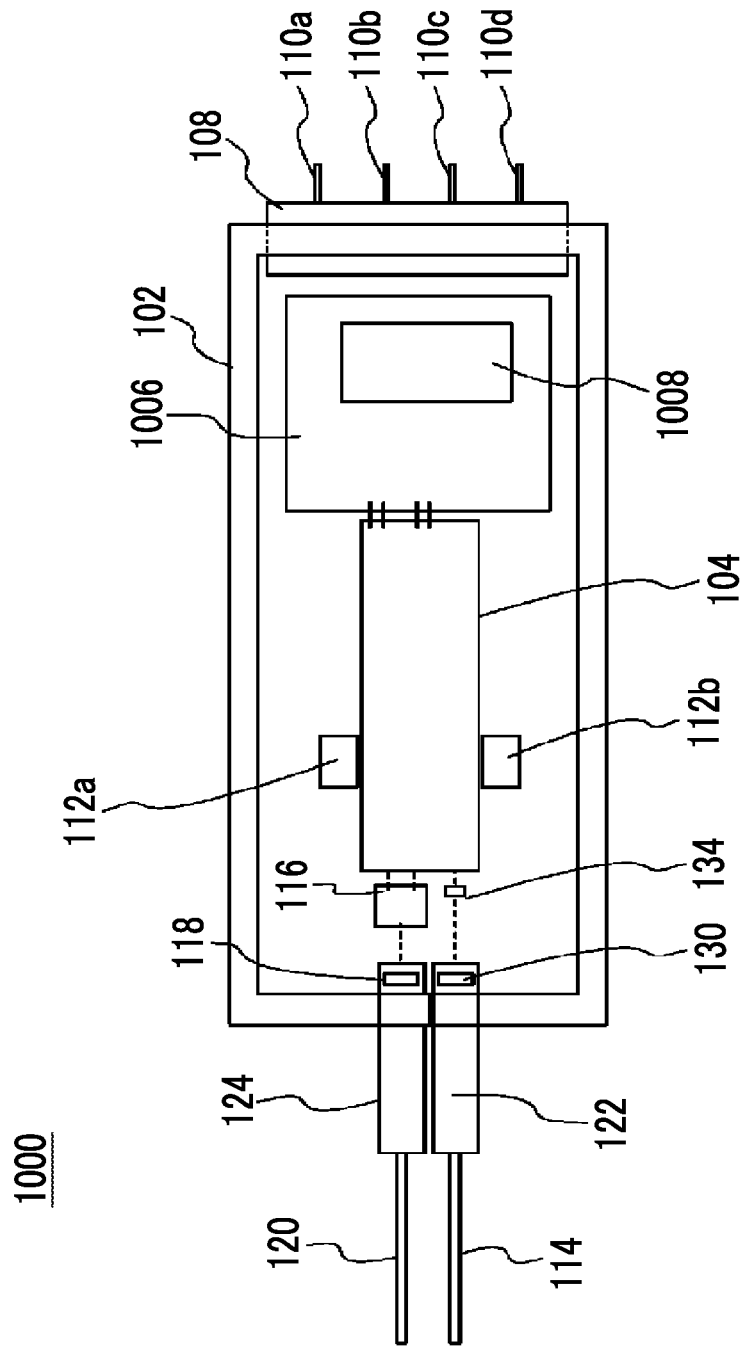
FIG. 10 is a diagram illustrating a configuration of an optical modulation module according to a second embodiment of the present invention.

Next, a second embodiment of the present invention will be described. The present embodiment is an optical modulation module 1000 using the optical modulation device 104 included in the optical modulator 100 according to the first embodiment. FIG. 10 is a diagram illustrating the configuration of the optical modulation module 1000 according to the present embodiment. In FIG. 10, the same components as those of the optical modulator 100 according to the first embodiment illustrated in FIG. 1 are shown using the same reference numerals as the reference numerals shown in FIG. 1, and the description of FIG. 1 is adopted.

The optical modulation module 1000 has the same configuration as that of the optical modulator 100 illustrated in FIG. 1, but differs from the optical modulator 100 in that a circuit substrate 1006 is provided instead of the relay substrate 106. The circuit substrate 1006 includes a drive circuit 1008. The drive circuit 1008 generates a high-frequency electrical signal for driving the optical modulation device 104, based on a modulation signal supplied from the outside via signal pins 110a, 110b, 110c, and 110d, and outputs the generated high-frequency electrical signal to the optical modulation device 104.

The optical modulation module 1000 having the above configuration includes the optical modulation device 104 having the configuration illustrated in FIGS. 4 to 9 at the intersecting portions of the optical waveguide 232 and the like and the electrode 250a and the like, similarly to the optical modulator 100 according to the first embodiment described above. Thus, similar to the optical modulator 100, in the optical modulation module 1000, without deteriorating optical characteristics and reducing long-term reliability of the optical modulation device 104, it is possible to effectively reduce an optical absorption loss of guided light which may occur at the intersecting portion of the optical waveguide 232 or the like and the electrode 250a or the like on the substrate 230, achieve good modulation characteristics, and perform a good optical transmission.

Third Embodiment

Figure 11:
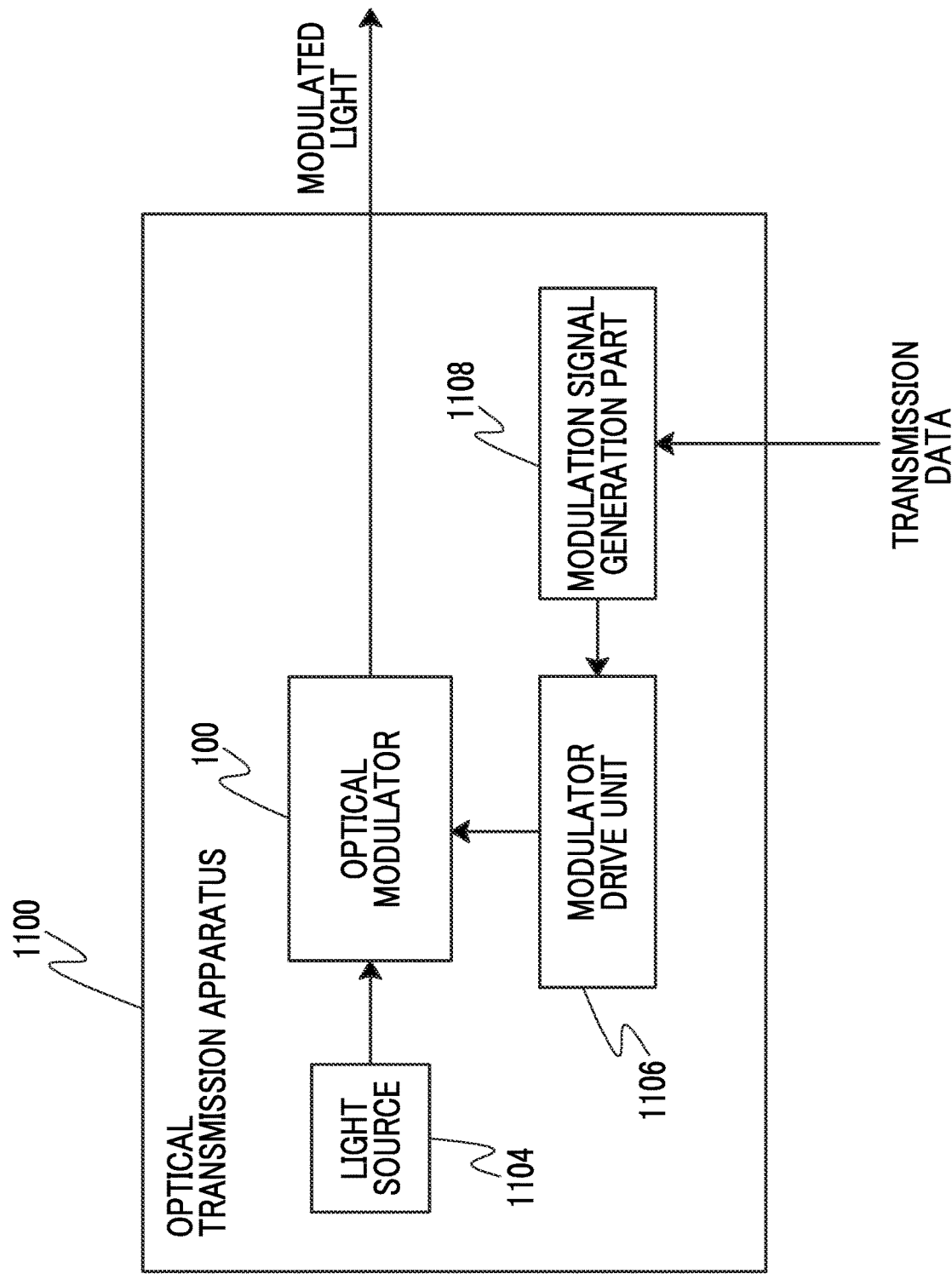
FIG. 11 is a diagram illustrating a configuration of an optical transmission apparatus according to a third embodiment of the present invention.
Figure 12:
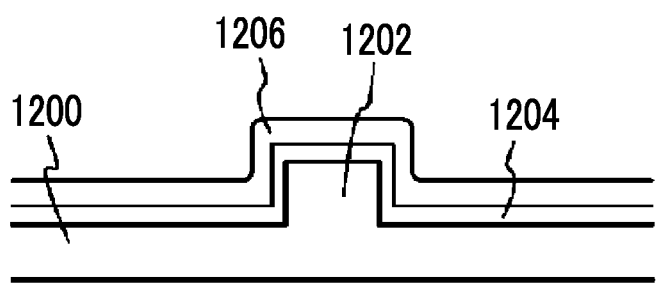
FIG. 12 is a diagram showing an example of a cross-sectional structure of an optical waveguide device in the related art.

Next, a third embodiment of the present invention will be described. The present embodiment is an optical transmission apparatus 1100 equipped with the optical modulator 100 according to the first embodiment. FIG. 11 is a diagram illustrating a configuration of an optical transmission apparatus 1100 according to the present embodiment. The optical transmission apparatus 1100 includes an optical modulator 100, a light source 1104 that inputs light to the optical modulator 100, a modulator drive unit 1106, and a modulation signal generation part 1108. The above-described optical modulation module 1000 can be used instead of the optical modulator 100 and the modulator drive unit 1106.

The modulation signal generation part 1108 is an electronic circuit that generates an electrical signal for causing the optical modulator 100 to perform a modulation operation, generates a modulation signal which is a high-frequency signal for causing the optical modulator 100 to perform an optical modulation operation according to the modulation data, based on transmission data given from the outside, and outputs the generated modulation signal to the modulator drive unit 1106.

The modulator drive unit 1106 amplifies the modulation signal input from the modulation signal generation part 1108 and outputs four high-frequency electrical signals for driving four signal electrodes 250a, 252a, 250b, and 252b of the optical modulation device 104 included in the optical modulator 100.

The four high-frequency electrical signals are input to the signal pins 110a, 110b, 110c, and 110d of the optical modulator 100 to drive the optical modulation device 104. Thus, the light output from the light source 1104 is, for example, DP-QPSK modulated by the optical modulator 100 to become modulated light, and is output from the optical transmission apparatus 1100.

In particular, since the optical transmission apparatus 1100 uses an optical modulator 100 provided with an optical modulation device 104 capable of effectively reducing the optical absorption loss at the intersecting portions of the optical waveguide 232 and the like and the electrode 250a and the like, good modulation characteristics are achieved and good optical transmission can be performed.

The present invention is not limited to the configurations of the above-described embodiment and its alternative configuration, and can be implemented in various embodiments without departing from the gist thereof.

For example, in the first embodiment described above, in the optical modulation device 104, it is assumed that the part B which is the intersecting portion of the input waveguide 232 and the bias electrode 264b-1 has the configurations shown in FIGS. 5, 6 and 7, the part C which is the intersecting portion of the input waveguide 232 and the signal electrode 252b has the configuration shown in FIG. 8, and the part D including two intersecting portions of the parallel waveguides 244b-1 and 244b-2 and the signal electrode 252b have the configuration shown in FIG. 9, but the present invention is not limited to this.

The optical modulation device 104, which is an optical waveguide device, can have any one configurations illustrated in FIGS. 5 to 9, with respect to a part or all intersecting portions of the optical waveguide 232 and the like and the electrode 250a and the like. Therefore, for example, when the parallel waveguides 240b-1 and 240b-2 are close to each other in FIG. 3, the configuration shown in FIG. 9 for the two intersections including the signal electrode 252b can be applied to two adjacent intersections, each composed of the parallel waveguides 240b-1 and 240b-2 and the bias electrode 264b-1. Further, for example, the conditions for the layer thickness and extension range of the resin layer shown in FIG. 6 or FIG. 8 can be applied to the layer thickness and extension range of the resin layer at adjacent intersections, an example of which is shown in FIG. 9.

Further, as readily understood by those skilled in the art, the combination of the features of each intersection shown in FIGS. 5, 6, 7, 8, and 9 can be applied to any intersection between the optical waveguide 232 or the like and the electrode 250*a* or the like. For example, intermediate layers similar to the intermediate layer 700 shown in FIG. 7 can be provided in the input waveguide 232 or the parallel waveguides 244*b*-1 and 244*b*-2 in the configurations shown in FIGS. 6, 8, and 9.

Further, in the configuration of the part D shown in FIG. 9, the resin layer 952 is configured with two resin layers, but the resin layer 952 may be configured with two or more resin layers in multiple layers. Alternatively, the resin layer 952 may be composed of a single layer as long as the boundary with the signal electrode 252*b* in the cross sections along the width direction of the parallel waveguides 244*b*-1 and 244*b*-2 can be curved (alternatively, as long as the upper surface of the resin layer 952*b* is formed into a desired curved surface with less unevenness).

Further, the cross-sectional shapes of the resin layers 952*a* and 952*b* shown in FIG. 9 are examples, and are not limited to this. The resin layer 952*a* can be formed to have a cross-sectional shape other than the shape shown in FIG. 9 as long as the upper surface of the resin layer 952*b* is formed to have a desired curved surface with less unevenness. For example, the resin layer 952*a* can be formed by filling only the recess portion between the parallel waveguides 244*b*-1 and 244*b*-2, which are two adjacent convex optical waveguides. Accordingly, the recess formed on the upper surface of the resin layer 952*a* can be formed shallower than the recess portion between the parallel waveguides 244*b*-1 and 244*b*-2, depending on the surface tension of the resin layer 952*a* when it is applied, so that the upper surface of the resin layer 952*b* formed thereon can be easily formed into a desired curved surface with less unevenness.

Further, in the modification example of the configuration of the part B shown in FIG. 7, the intermediate layer 700 provided on the input waveguide 232 is composed of $SiO_2$, but the material of the intermediate layer 700 is not limited to this. The intermediate layer 700 can be an insulating layer made of any material such as $SiO_2$ or SiN having a higher refractive index and electrical insulation than the optical waveguide 232 or the like, or a transparent insulating layer (for example, a layer made of SiN or the like).

Further, in the first embodiment described above, each intersection is configured by orthogonally intersecting the electrode 250*a* or the like and the optical waveguide 232 or the like, but the present invention is not limited to this. The configurations of the intersections shown in FIGS. 5 to 9 described above can be applied to intersections between the electrode 250*a* or the like and the optical waveguide 232 or the like formed by the electrode 250*a* or the like crossing over the optical waveguide 232 or the like, where the electrodes 250*a*, or the like intersects the optical waveguides 232, or the like at any angles (non-parallel).

Further, in the above-described embodiments, as an example of the optical waveguide device, the optical modulation device 104 formed of the substrate 230 of LN (LiNbO3) is shown, but without being limited to this, the optical waveguide device can be a device having any function (in addition to optical modulation, optical switch, optical directional coupler, or the like), which is formed of a substrate of any material (in addition to LN, InP, Si, or the like).

As described above, the optical modulation device 104, which is an optical waveguide device configuring the optical modulator 100 according to the first embodiment described above, includes the substrate 230 on which the optical waveguide 232 and the like are formed, and the electrode 250*a* or the like formed on the substrate 230 and having an intersection 470 crossing over the optical waveguide 232. The optical waveguide 232 or the like is a convex optical waveguide formed with a protruding portion extending on the substrate 230, and a resin layer 452 or the like is provided between the optical waveguide 232 or the like and the electrode 250*a* or the like at the intersection 470 or the like. The resin layer 452 and the like are formed to cover the upper surface and the side surface of the protruding portions of the optical waveguide 232 and the like, and the boundaries with the electrodes 250*a* and the like are formed by curves in the cross section along the width direction of the optical waveguide 232 and the like.

According to this configuration, it is possible to effectively reduce an optical absorption loss of guided light due to an electrode metal, which may occur at the intersection 470 or the like between the optical waveguide 232 or the like on the substrate 230 and the electrode 250*a* or the like, without deteriorating optical characteristics and reducing long-term reliability of the optical modulation device 104 composed of a convex optical waveguide.

Further, in the optical modulation device 104, the curve of the resin layer 452, or the like has a radius of curvature of ¼ or more of the height of the protruding portion of the convex waveguide configuring the optical waveguide 232 or the like, measured from the surface of the substrate 230. According to this configuration, the stress concentration on the corners (corner portions) of the resin layer 452 or the like can be more effectively relaxed, and the optical absorption loss of the guided light can be effectively reduced, without deteriorating the optical characteristics and reducing the long-term reliability.

Further, in the optical modulation device 104, for example, like the resin layer 452', the resin layer 452 and the like can be configured to extend from the side surfaces of the protruding portions of the substrate 230 that configure the optical waveguide 232 and the like over a range (the range of the distance W2) wider than the width W1 of the protruding portion, along the width direction of the optical waveguide 232 and the like. Further, for example, like the resin layer 452', the resin layer 452 or the like can be formed such that the thickness t2 at the top of the protruding portion of the substrate 230 configuring the optical waveguide 232 or the like has a value larger than the height t1 of the protruding portion, measured from the surface of the substrate 230. According to these configurations, the stress applied to the substrate 230 due to the internal stress of the electrode 250*a* and the like and the stress applied from the substrate 230 to the electrode 250*a* and the like due to the difference in the linear expansion coefficient of each part are more effectively relaxed.

Further, as a modification example of the intersection 470 of the optical modulation device 104, for example, an intermediate layer 700 containing silicon dioxide (SiO2) is formed on the upper surface of the protruding portion of the substrate 230 that configures the input waveguide 232, and a resin layer 452 is formed on the top of the intermediate layer 700. According to this configuration, the stress applied to the substrate 230, the electrode 250*a*, or the like can be relaxed while utilizing the high electrical insulation, transparency, and stability over time of $SiO_2$.

Further, for example, the resin layer 952 of the optical modulation device 104 is formed to extend over a plurality of adjacent intersections 970-1 and 970-2. With this configuration, the contact area between the resin layer 952 and the substrate 230 can be increased, and the adhesion of the resin layer 952 to the substrate 230 can be improved.

Further, the resin layer 952 extending over the adjacent intersections 970-1 and 970-2 is formed of a plurality of layers. According to this configuration, it is possible to easily reduce unevenness generated on the upper surface of the resin layer 952 due to the recess portion of the substrate 230 between the parallel waveguides 244b-1 and 244b-2, which are convex optical waveguides forming the intersections 970-1 and 970-2, respectively.

Further, the substrate 230 is made of a material having a photoelastic effect (lithium niobate, for example). According to this configuration, in an optical waveguide device composed of a convex optical waveguide, using a substrate in which stress can affect optical characteristics and electrical characteristics through the photoelastic effect, it is possible to effectively reduce the optical absorption loss of guided light due to electrode metal that may occur at the intersection between the optical waveguide and the electrode, without deteriorating the optical characteristics and reducing the long-term reliability.

Further, the substrate 230 has a thickness of 20 μm or less. According to this configuration, in an optical waveguide device that has low mechanical strength and is easily affected by stress, it is possible to effectively reduce an optical absorption loss of guided light due to an electrode metal, which may occur at the intersection of an optical waveguide and an electrode, without deteriorating optical characteristics and reducing long-term reliability.

Further, the optical modulator 100 according to the first embodiment includes an optical modulation device 104 which is an optical waveguide device, a housing 102 that houses the optical modulation device 104, an input optical fiber 114 that inputs light to the optical modulation device 104, and an output optical fiber 120 that guides the light output by the optical modulation device 104 to the outside of the housing 102.

Further, the optical modulation module 1000 according to the second embodiment includes an optical modulation device 104 that modulates light, which is an optical waveguide device, and a drive circuit 1008 that drives the optical modulation device 104.

Further, the optical transmission apparatus 1100 according to the third embodiment includes an optical modulator 100 or an optical modulation module 1000, and a modulation signal generation part 1108 which is an electronic circuit for generating an electrical signal for causing the optical modulation device 104 to perform a modulation operation.

According to these configurations, an optical modulator 100, an optical modulation module 1000, or an optical transmission apparatus 1100 having good characteristics can be achieved.

REFERENCE SIGNS LIST

100 Optical modulator
102 Housing
104 Optical modulation device
106 Relay substrate
108 Feedthrough section
110a, 110b, 110c, 110d Signal pin
112a, 112b Terminator
114 Input optical fiber
116 Optical unit
118, 130, 134 Lens
120 Output optical fiber
122, 124 Support
230, 1200 Substrate
232 Input waveguide
234 Branched waveguide
240a, 240b Nested Mach-Zehnder type optical waveguide
244a, 244b, 246a, 246b Mach-Zehnder type optical waveguide
240b-1, 240b-2, 244a-1, 244b-1, 244b-2 Parallel waveguide
248a, 248b Output waveguide
250a, 250b, 252a, 252b, 252b Signal electrode
254a, 254b, 254b-1, 256a, 256b, 258a, 258b, 260a, 260b Pad
262a, 262b, 264a, 264b, 264b-1 Bias electrode
280a, 280b, 280c, 280d Side
452, 452', 852, 952, 952a, 952b Resin layer
452-1, 452-2, 852-1, 852-2, 952-1, 952-2 Curve
470, 870, 970-1, 970-2 Intersection
590 Adhesive layer
592 Support substrate
700 Intermediate layer
1000 Optical modulation module
1006 Circuit substrate
1008 Drive circuit
1100 Optical transmission apparatus
1104 Light source
1106 Modulator drive unit
1108 Modulation signal generation part
1202 Convex optical waveguide
1204 Sio2 layer
1206 Electrode

The invention claimed is:

1. An optical waveguide device comprising:
a substrate;
an optical waveguide formed on the substrate; and
an electrode that has an intersection traversing over the optical waveguide, wherein
the substrate is a LiNbO$_3$ substrate having a photoelastic effect and having a thickness of 20 μm or less,
the optical waveguide is formed with a protruding portion extending on the LiNbO$_3$ substrate,
the electrode overlaps the optical waveguide in a state of being bent in a substantially Ω-shape in a cross-sectional view along a width direction of the optical waveguide at the intersection,
a resin layer is provided between the optical waveguide and the electrode at the intersection, and
the resin layer is formed to cover an upper surface and a side surface of the protruding portion of the optical waveguide, and the resin layer has, in a cross section along the width direction of the optical waveguide, a boundary with the electrode, the boundary being formed by a curve.

2. The optical waveguide device according to claim 1, wherein
the curve has a radius of curvature of ¼ or more of a height of the protruding portion, measured from a surface of the substrate.

3. The optical waveguide device according to claim 1, wherein
the resin layer extends from the side surface of the protruding portion to a range wider than a width of the protruding portion along the width direction of the optical waveguide.

4. The optical waveguide device according to claim 1, wherein
the resin layer is formed such that a thickness at a top of the protruding portion has a value larger than a height of the protruding portion, measured from a surface of the substrate.

5. The optical waveguide device according to claim 1, wherein
an intermediate layer containing silicon dioxide ($SiO_2$) is formed on the upper surface of the protruding portion, and the resin layer is formed on a top of the intermediate layer.

6. The optical waveguide device according to claim 1, wherein
the resin layer is formed to extend over an adjacent plurality of the intersections.

7. The optical waveguide device according to claim 6, wherein
the resin layer is formed of a plurality of layers.

8. An optical modulator comprising:
the optical waveguide device according to claim 1, which is an optical modulation device that modulates light;
a housing that houses the optical waveguide device;
an optical fiber that inputs light to the optical waveguide device; and
an optical fiber that guides light which is output by the optical waveguide device to an outside of the housing.

9. An optical transmission apparatus comprising:
the optical modulator according to claim 8; and
an electronic circuit that generates an electrical signal for causing the optical waveguide device to perform a modulation operation.

10. An optical modulation module comprising:
the optical waveguide device according to claim 1, which is an optical modulation device that modulates light; and
a drive circuit that drives the optical waveguide device.

* * * * *